United States Patent [19]

Storm

[11] Patent Number: 5,271,128
[45] Date of Patent: Dec. 21, 1993

[54] HOOK

[75] Inventor: Ingvar Storm, Arbra, Sweden

[73] Assignee: Igesto AB, Arbra, Sweden

[21] Appl. No.: 945,644

[22] PCT Filed: May 16, 1991

[86] PCT No.: PCT/SE91/00350
§ 371 Date: Nov. 4, 1992
§ 102(e) Date: Nov. 4, 1992

[87] PCT Pub. No.: WO91/18216
PCT Pub. Date: Nov. 28, 1991

[30] Foreign Application Priority Data

May 16, 1990 [SE] Sweden .................. 9001774

[51] Int. Cl.$^5$ .................. A44B 13/00; B66C 1/00
[52] U.S. Cl. .................. 24/601.5; 24/600.1; 294/82.33
[58] Field of Search ............ 24/601.5, 599.4, 600.1, 24/600.3, 600.6, 68 CD, 71.2; 403/369; 294/82.77, 82.33

[56] References Cited

U.S. PATENT DOCUMENTS

| 2,706,318 | 4/1955 | Coffing | 294/82.2 |
| 2,987,341 | 6/1961 | Peck et al. | 294/82.33 |
| 3,173,718 | 3/1965 | Harley | 294/82.33 |
| 3,292,226 | 12/1966 | Foster | 24/601.5 |
| 4,093,293 | 6/1978 | Huggett | 24/600.1 |
| 4,294,479 | 10/1981 | Archer | 24/600.1 |
| 4,358,146 | 11/1982 | Goudey | 294/82.27 |

FOREIGN PATENT DOCUMENTS 2138436 2/1972 Fed. Rep. of Germany .
674463 12/1983 U.S.S.R. .

Primary Examiner—Victor N. Sakran
Attorney, Agent, or Firm—Nies, Kurz, Bergert & Tamburro

[57] ABSTRACT

A safety hook comprising a curved hook body provided with a hook opening defined by a substantially U-shaped part and pivotally connected to a hook head which carries a pivotal shackle device, wherein the hook body, in a first open position, is held swung relative to the hook head so as to leave the hook opening open and therewith enable a load to be hooked onto the hook body, and wherein the hook body, in a second closed position, is swung relative to the hook head such that the hook opening is blocked by means of a barrier part which projects outwardly from the hook head, and wherein latching devices are provided for releasably securing the hook body essentially in the second position. The hook is mainly characterized in that the hook body is held in the first position by a spring force, in that the weight distribution on the hook is such that the opening defined by the U-shaped part is essentially horizontal in a vertical plane when the hook hangs substantially freely with no load thereon, and in that when the U-shaped part is subjected to a downwardly acting load, the U-shaped part is swung against a spring force towards and to the second closed position, the spring force striving to return the hook body to the first position.

6 Claims, 1 Drawing Sheet

HOOK

The present invention relates to a safety hook of the kind which comprises a curved hook body having a hook opening which is defined by a U-shaped part, said hook body being pivotally connected to a hook head which carries a pivotal shackle device and which hook body in a first open position is held pivoted relative to the hook head so the hook opening is open, therewith enabling a load to be hooked onto the hook body, and wherein the hook body in a second, closed position is pivoted relative to the hook head such as to block the hook opening by means of an outwardly projecting barrier part of the hook head, and wherein a latching device is provided for releasably securing the hook body essentially in said second position.

Safety hooks of this general kind are known to the art. However, no hook which provides an attractive solution with regard to its function and manufacture and which is adapted to enable a load to be placed on the hook in a simple and secure fashion and which allows the hook to be releasably secured is not known to the art at this present time. The present invention relates to such a solution.

Thus, the invention relates to a safety hook which includes a curved hook body provided with a hook opening defined by a substantially U-shaped part and pivotally connected to a hook head which carries a pivotal shackle device, wherein the hook body, in a first, open, position, is held swung relative to the hook head so as to leave the hook opening open and therewith enable a load to be hooked onto the hook body, and wherein the hook body, in a second, closed, position, is swung relative to the hook head such that the hook opening is blocked by means of a barrier part which projects outwardly from the hook head, and wherein latching devices are provided for releasably securing the hook body essentially in said second position, and wherein the hook body is held in said first position by a spring force, and wherein the U-shaped part when subjected to a downwardly acting load, is arranged to swing against a spring force towards and into said second, closed position, said spring force striving to return the hook body to said first position and wherein the weight distribution on said hook is such that the opening defined by the U-shaped part is essentially horizontal in a vertical plane when the hook hangs substantially freely with no load acting thereon.

The hook is mainly characterized in that said latching devices include a pivotally mounted crook which includes a shoulder part which is intended to coact securingly with a shoulder part on the hook body, this securing coaction, by means of a latching member comprised by the latching devices, essentially preventing the crook from pivoting and by that means essentially preventing the hook part from swinging from said second position to said first position.

The invention will now be described in more detail with reference to an exemplifying embodiment thereof and with reference to the accompanying drawings, in which FIG. 1 is a schematic sectional view of a first embodiment of an inventive hook taken essentially centrally and transversely of the pivot axes occurent on said hook;

Figure 1:
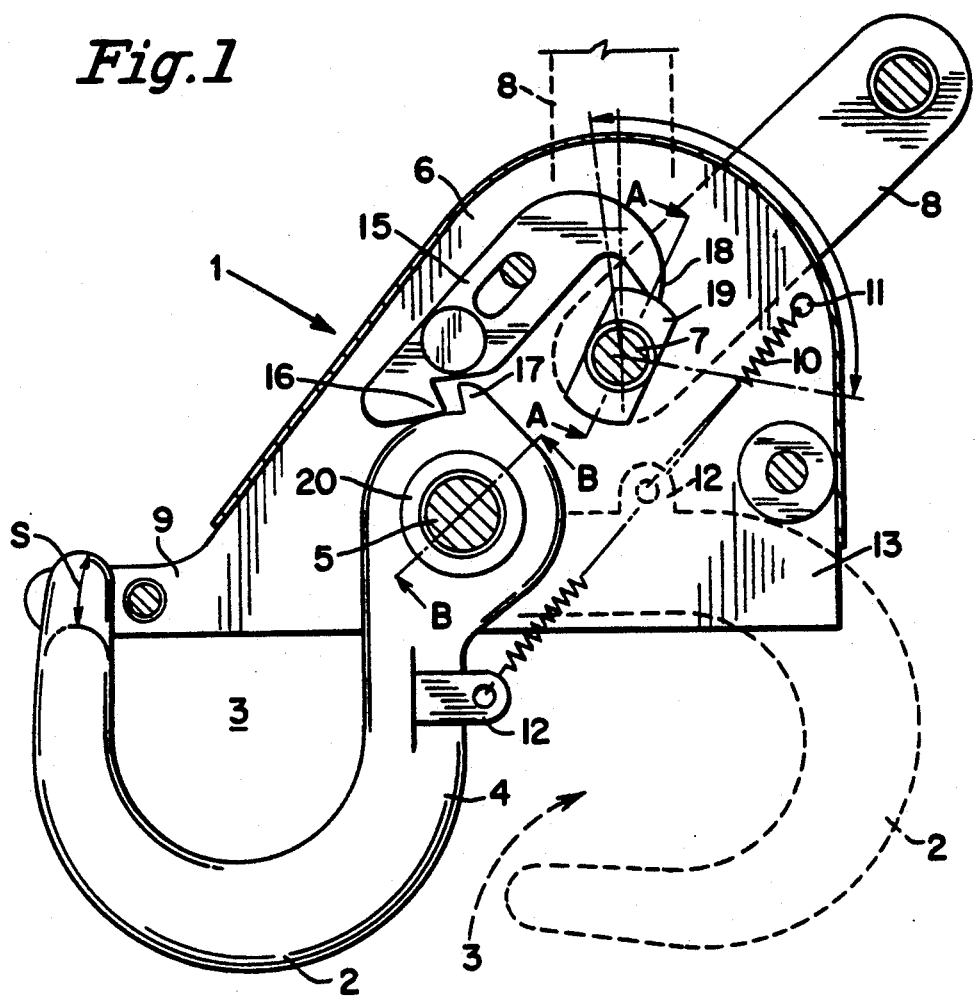

Illustrated in the Figures is a safety hook 1 which comprises a hook body 4 which has a hook opening 3 defined by means of an essentially U-shaped part 2 and which is pivotally connected, for example by means of a pivot axle 5, with a hook head 6 which carries a shackle device or like device 8 which is pivotally mounted, for example by means of a pivot axle 7, and from which the hook 1 is intended to hang. The hook body 4 is intended to be held swung in relation to the hook head in a first, open position, shown in broken lines in FIG. 1, so as to leave the hook opening 3 open and therewith enable a load to be readily hooked onto the hook body, and to be swung relative to the hook head in a second, closed position, shown in full lines in FIG. 1, such that the hook opening 3 will be blocked by means of a barrier part 9 projecting out from the hook head 6. The hook arrangement also includes latching devices, which will be described in detail herebelow and which are intended to releasably secure the hook body against unintentional release of the hook body essentially in said second position.

The hook body 4 is held in said first position by means of a spring force, and, accordingly, in the illustrated embodiment a tension spring 10 acts between an attachment 11, 12 on the hook head and the hook body respectively.

The hook weight distribution is such that when no load is attached to the hook, the hook will hang freely downwards and the opening defined by the U-shaped part will be generally horizontal in a vertical plane. When the U-shaped part is subjected to a downwardly acting force, the U-shaped part is intended to swing against a spring force towards and to said second position. The spring force strives to return the hook body to said first position. The distribution of weight on the hook in said second position is preferably such that the pivot axle 7 of the shackle device and the pivot axle 5 of the hook body will lie on an essentially vertical line.

In the case of the illustrated embodiment, the hook head includes two, mutually essentially parallel side walls 13, 14, between which the hook body 4 is pivotally mounted by means of an axle 5 which extends between the side walls, said side walls forming the aforesaid barrier part 9.

Figure 2:
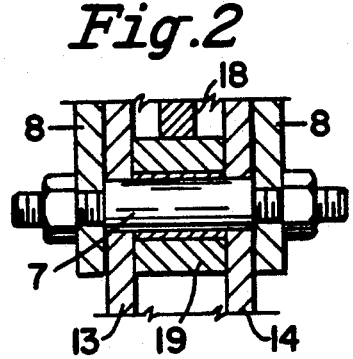
FIG. 2 is a sectional view taken on the line A—A in FIG. 1.
Figure 3:
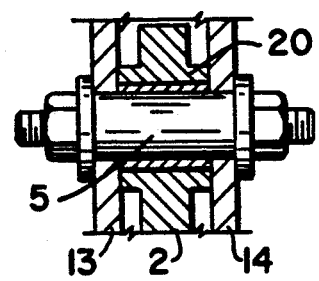
FIG. 3 is a sectional view taken on the line B—B in FIG. 1.

In the embodiment illustrated in FIGS. 1-3, the latching devices comprise a pivotal crook 15 which includes a shoulder abutment part 16 which functions to coact positively with a shoulder abutment part 17 on the hook body 4. This mutual coaction of the shoulder abutment parts ensures that the crook 15 is unable to pivot and also that the hook part is essentially prevented from pivoting from the second position to the first position.

The crook 15 of the illustrated embodiment is intended to coact, through the intermediary of a pawl-shaped latching finger 18, on the crook with a cam-shaped latching member 19 which is pivotal together with the shackle devices and the extension contour of which varies transversely to the pivot axle 7 of said shackle devices, wherewith the crook is prevented from leaving its hook securing position by means of said latching member 19 when the hook head and the hook body hang essentially freely from the shackle devices in a hanging position and take said second position, but are able to leave this securing position subsequent to pivoting of the shackle devices and therewith said latching device to a predetermined extent from said hanging position, as illustrated in FIG. 1.

The hook body 4 is preferably pivotally mounted on an axle 5 by means of a hub 20 which carries the shoulder part 17 of said hook body which projects outwards in a generally radial direction, as shown in FIG. 1, said shoulder part 17 preferably being located on the opposite side of the axle 5 to said U-shaped part. In the case of the illustrated embodiment, the crook 15 is swung from the securing position by means of the hook body, under the action of said spring force, said crook and said hook body being swung in mutually different directions. Embodiments are conceivable, however, in which these two hook components swing in mutually the same direction.

In the illustrated embodiment, the latching devices are provided with a given clearance s with regard to pivoting of the hook body in said second position, so that when the hook body hangs freely in a loaded state, said body is able to swing within the limits of said clearance before the latching devices become active under load.

The manner in which the inventive hook functions will be understood in all essentials from the aforegoing. Subsequent to attaching a load to the hook in said first hook position, the hook body is swung under the influence of said load and against a spring force to the second position in which the hook body is automatically secured against pivotal movement in the return direction. In order to release the hook from its secured state, it is necessary to first pivot the shackle devices in order to release the crook.

It will be understood from the aforegoing that the invention provides an extremely purposeful safety hook.

Although the invention has been described with reference to various embodiments thereof, the invention is not restricted to these embodiments and that minor changes and modifications can be made without departing from the inventive concept.

I claim:

1. A safety hook comprising: a hook head with a barrier part (9) projecting out from one side of the hook head; a curved hook body provided with a hook opening defined by a substantially U-shaped part pivotally connected to said hook head; a shackle device pivotally carried by said hook head and carrying a cam-shaped latching member (19) which will pivot with the shackle device as it pivots relative to said hook head; said hook body, in a first, open, position, is disposed relative to the hook head so as to leave the hook opening facing toward one side to enable a load to be hooked laterally onto the hook body, and wherein said hook body, in a second, closed, position, is pivoted relative to the hook head so that the hook opening is blocked by means of said barrier part which projects to one side of the hook head; and latching devices provided for releasably securing the hook body essentially in said second position, including a spring connected between said hook head and the hook body to bias said hook body to said first position by spring force, the U-shaped part (2), when subjected to a downwardly acting load hooked thereon, is adapted to pivotally swing against said spring force towards and into said second, closed position, said spring force providing a bias urging a return of the hook body to said first position, the weight distribution of said safety hook (1) being such that the opening defined by the U-shaped part (2) is disposed essentially horizontal as viewed in a vertical plane when the hook (1) hangs substantially freely with no load acting thereon, said latching devices further including a first shoulder abutment part (17) projecting radially from the pivotal part of the hook body, a crook (15) pivotally mounted on said hook head, said crook including a second shoulder abutment part (16) which is intended to coact securingly with said first shoulder abutment part (17), said securing coaction providing by means of said latching member (19) engaging and preventing the crook (15) from pivoting its second abutment part away from abutting coaction with said first shoulder abutment part, latching and preventing said hook body (4) from pivotally swinging from said second position to said first position.

2. A hook according to claim 1, wherein said hook head (6) includes two parallel side walls (13, 14), between which an axle (5) extends and provides the pivotal connection of said hook body to the hook head, and said side walls form said barrier part (9).

3. A hook according to claim 2, wherein the hook body is pivotally mounted on said axle (5) by means of a hub part (20) of said hook body which carries said radially projecting first shoulder abutment part said first shoulder abutment part preferably being located on the opposite side of the axle (5) from said U-shaped part (2).

4. A hook according to claim 1, wherein said latching devices (15, 16, 17, 18, 19) are configured with a predetermined clearance enabling pivotal movement of said hook body (4) while in said second position, so that when the hook body hangs freely in a loaded state, said body is able to swing within the limits of said clearance before the latching devices are subjected load.

5. A hook according to claim 1, wherein said crook (15) includes a pawl-shaped latching finger which coacts with said latching member (19) that will pivot and rotate, together with the shackle device (8) and the extension contour of which varies transversely to the pivot axle (7) of the shackle device, whereby the crook is prevented from leaving its securing position by means of said latching member when the hook head and the hook body hang essentially freely from the shackle devices in a hanging position under load and take said second position, but said crook is able to leave its securing position subsequent to pivoting of the shackle devices (8) and therewith pivotal movement of said latching member (19) from said hanging position to a predetermined extent.

6. A hook according to claim 1, wherein following depositing of a load on a support, the crook (15) is pivoted away from said securing position by means of the hook body under the influence of said spring biasing force, said crook and said hook body pivoting in mutually opposite directions.

* * * * *